United States Patent
Ahnert et al.

(10) Patent No.: US 8,933,577 B2
(45) Date of Patent: Jan. 13, 2015

(54) PITCH SYSTEM FOR A WIND ENERGY SYSTEM AND METHOD FOR OPERATING A PITCH SYSTEM

(71) Applicant: Siemens Aktiengesellschaft, München (DE)

(72) Inventors: Karsten Ahnert, Chemnitz (DE); Thomas Demuth, Limbach-Oberfrohna (DE); Steffen Hellmich, Chemnitz (DE); Markus Mauersberger, Chemnitz (DE); Andres Männer, Chemnitz (DE)

(73) Assignee: Siemens Aktiengesellschaft, München (DE)

( * ) Notice: Subject to any disclaimer, the term of this patent is extended or adjusted under 35 U.S.C. 154(b) by 130 days.

(21) Appl. No.: 13/645,013

(22) Filed: Oct. 4, 2012

(65) Prior Publication Data

US 2013/0088010 A1   Apr. 11, 2013

(30) Foreign Application Priority Data

Oct. 5, 2011   (EP) .................................... 11183948

(51) Int. Cl.
| | | |
|---|---|---|
| *F03D 9/00* | (2006.01) | |
| *F03D 7/00* | (2006.01) | |
| *F03D 7/02* | (2006.01) | |
| *H02M 5/458* | (2006.01) | |
| *H02J 7/34* | (2006.01) | |
| *H02M 1/00* | (2006.01) | |

(52) U.S. Cl.
CPC ................ *F03D 7/00* (2013.01); *F03D 7/0224* (2013.01); *F05B 2260/76* (2013.01); *F05B 2260/80* (2013.01); *F05B 2260/83* (2013.01); *Y02E 10/723* (2013.01); *F05B 2270/107* (2013.01); *H02M 5/458* (2013.01); *H02J 7/34* (2013.01); *H02M 2001/007* (2013.01)
USPC ........................................................... 290/55

(58) Field of Classification Search
USPC ..................................................... 290/44, 55
See application file for complete search history.

(56) References Cited

U.S. PATENT DOCUMENTS

| | | | |
|---|---|---|---|
| 7,256,509 B2 * | 8/2007 | Brandt et al. .................... | 290/44 |
| 8,432,050 B2 * | 4/2013 | Rowan et al. ................... | 290/44 |
| 2009/0167575 A1 * | 7/2009 | Mitani et al. .................. | 341/118 |
| 2010/0158687 A1 | 6/2010 | Dawson | |
| 2010/0259045 A1 * | 10/2010 | Vilbrrandt ....................... | 290/44 |
| 2011/0181045 A1 * | 7/2011 | Letas et al. ..................... | 290/44 |
| 2012/0038328 A1 * | 2/2012 | Khan ............................ | 320/167 |

FOREIGN PATENT DOCUMENTS

| | | |
|---|---|---|
| DE | 10 2008 025 944 B4 | 9/2010 |
| DE | 10 2009 025 819 A1 | 11/2010 |
| DE | 2009 003 843 A1 | 12/2010 |

* cited by examiner

*Primary Examiner* — Tho D Ta

(74) *Attorney, Agent, or Firm* — Henry M. Feiereisen LLC

(57) ABSTRACT

A pitch system of a wind energy system includes an emergency energy store for moving a rotor blade into a safety position in the event of the failure of an external energy supply. The emergency energy store can be tested, for example to assess aging, by supplying electrical energy to an actuating device configured to set a pitch angle of a rotor blade even in a normal operating mode of the wind energy system temporarily exclusively from the emergency energy store. This configuration ensures reliable operation of a wind energy system.

15 Claims, 2 Drawing Sheets

PITCH SYSTEM FOR A WIND ENERGY SYSTEM AND METHOD FOR OPERATING A PITCH SYSTEM

CROSS-REFERENCES TO RELATED APPLICATIONS

This application claims the priority of European Patent Application, Serial No. EP11183948, filed Oct. 5, 2011, pursuant to 35 U.S.C. 119(a)-(d), the content of which is incorporated herein by reference in its entirety as if fully set forth herein.

BACKGROUND OF THE INVENTION

The present invention relates to a pitch system for a wind energy system and a method for operating a pitch system.

The following discussion of related art is provided to assist the reader in understanding the advantages of the invention, and is not to be construed as an admission that this related art is prior art to this invention.

In wind energy systems, a pitch angle can be set by a pitch system according to the wind forces acting on the rotor blade during operation and, in this way, a drive torque for an electric generator of the wind energy system can be regulated. For this purpose, the pitch angles required are fed to the pitch system by means of a corresponding control signal from a generator control system. This generator control system is also referred to as a turbine control system.

An electrical pitch system may include an emergency energy store which is dimensioned according to an energy requirement in order to move a rotor blade into a safety position (by an "emergency maneuver") in the event of the failure of the external energy supply and thus safely to brake the wind energy system. It is usual, in this process, to move to the feathered position, in which a blade plane of the rotor blade is arranged perpendicular to the plane of rotation of the rotor blades.

The emergency energy store may include double layer capacitors. These age over their operating life and thereby lose capacitance. For this reason, monitoring and regular testing of the emergency energy store is necessary in order to be able to ensure the functioning of the emergency maneuver and to determine the point at which the store needs to be replaced.

A disadvantage of the conventional solutions is that, for testing an emergency energy store, relatively expensive electrical test circuits are needed and the testing takes time, during which the wind energy system cannot be used for generating electrical energy.

It would therefore be desirable and advantageous to obviate prior art shortcomings and to provide an improved method and system in order to ensure reliable operation of a wind energy system while simultaneously ensuring a high degree of availability of said system.

SUMMARY OF THE INVENTION

According to one aspect of the present invention, a method for operating a pitch system of a wind energy system includes the steps of setting—in a normal operating mode of the wind energy system—with an actuating device of the pitch system a pitch angle of a rotor blade of the wind energy system in response to a control signal from a generator control system of the wind energy system, wherein the actuating device is at least temporarily supplied with electrical energy from an external electrical supply network. In an emergency operating mode, the rotor blade is moved with the actuating device into a safety position, wherein the actuating device is supplied with electrical energy from an emergency energy store of the pitch system. A characteristic value of the emergency energy store is tested by temporarily supplying the actuating device in the normal operating mode with electrical energy exclusively from the emergency energy store.

According to another aspect of the present invention, a pitch system for setting a pitch angle of at least one rotor blade of a wind energy system includes at least one actuating device for setting a pitch angle of at least one rotor blade, a supply connection for receiving electrical energy from an electrical supply network, an emergency energy store for operating the at least one actuating device when the supply network fails, and a control device. The control device is configured to control the at least one actuating device responsive to a control signal from a generator control system by at least temporarily supplying the actuating device—in a normal operating mode of the wind energy system—with electrical energy from the electrical supply network, and—when the supply network fails—moving the rotor blade with the actuating device into a safety position, wherein the actuating device is then supplied with electrical energy from the emergency energy store. A characteristic value of the emergency energy store is tested by temporarily supplying the actuating device in the normal operating mode with electrical energy exclusively from the emergency energy store.

A pitch system of a wind energy system is operated according to the inventive method in that, in a normal operating mode of the wind energy system, using an actuating device of the pitch system, a pitch angle of a rotor blade of the wind energy system is set according to a control signal from a generator control system of the wind energy system. In this way, the actuating device is supplied with electrical energy at least temporarily from an electrical supply network which is external relative to the pitch system. In a second operating mode, an emergency operating mode, the rotor blade is moved by means of the actuating device into a safety position. For this purpose, the actuating device is supplied with electrical energy from an emergency energy store of the pitch system. The pitch system can thus be operated, for example, in the emergency operating mode if the external supply network fails and the wind energy system must therefore be shut down.

According to an advantageous feature of the present invention, for example an aging state of the emergency energy store can be ascertained by testing a characteristic value of the emergency energy store by temporarily supplying electrical energy to the actuating device also in the normal operating mode exclusively from the emergency energy store.

Since the wind energy system is in the normal operating mode during testing, no dedicated load resistance can be used as the electrical load to test the emergency energy store. However, the actuating device will adjust the pitch angle of a rotor blade from time to time and will thereby consume energy. This process can thus be used to observe the discharging behavior of the emergency energy store and to draw conclusions regarding the aging state thereof.

The inventive method has the advantage that the availability of the system for normal operation of the wind energy system is thereby increased, since the wind energy system does not have to be stopped for testing the emergency energy store, but rather can continue producing energy. Switching over from an operating mode to a test mode of the actuator is not necessary. A further advantage is that no additional resistor and no blocked-rotor electric motor are needed for discharging the emergency energy store in order to test said store.

Advantageously, the inventive method can be used in conjunction with energy stores which comprise double-layer capacitors, lithium ion batteries or a combination of these stores ("hybrid stores"). One embodiment of the inventive method is accordingly configured to test, as the characteristic value, a capacitance and/or an internal resistance of a capacitor of the emergency energy store, in particular a double-layer capacitor. With this development, it is also possible regularly and frequently to test emergency energy stores having capacitors and thus also to operate reliably a wind energy system in which double-layer capacitors are used as emergency energy stores. A capacitor can be tested by supplying the actuating device with the energy from the emergency energy store for a pre-determined duration and by subsequently merely testing whether a voltage generated by the emergency energy supply still lies above a threshold value. Advantageously, a capacitance value may be determined as the capacity of the capacitor. This is the most accurate and therefore most reliable method of testing the functional capability of a double-layer capacitor.

A suitable characteristic value by means of which an aging state of the emergency energy store can be determined is, for example, as already stated, a storage capacitance or an internal resistance. These depend on the temperature conditions during the determination thereof. According to another advantageous feature of the present invention, in order to test the characteristic value, at least one value may be determined for at least one of the following operating variables: An electrical voltage applied to the emergency energy store, an electric current flowing into or out of the emergency energy store, an ambient temperature of the emergency energy store, an internal temperature of the emergency energy store. The operating variable may be determined either directly or indirectly by measuring further operating variables and drawing conclusions concerning the value of the desired operating variable.

The aging state of the energy store can be determined more precisely by measuring an ambient temperature or an internal temperature of the emergency energy store in addition to the current and the voltage. Double-layer capacitors, in particular, have a temperature-dependent capacity. The aging state of these double-layer capacitors can be determined more precisely by observing their charging and discharging process. In this way, the internal resistance of the store can also be better determined.

According to another advantageous feature of the present invention, the actuating device and the emergency energy store may be supplied with electrical energy from the supply network via at least one DC/DC converter. According to this embodiment, in order to test the characteristic value, the at least one DC/DC converter is deactivated. The actuating device is then automatically and exclusively supplied from the emergency energy store. In other words, the DC/DC converter is used as a switch. This has the advantage that no additional switching device needs to be provided to enable testing of the characteristic value during the normal operating mode.

A DC/DC converter may advantageously also be used in another respect. If a voltage value is needed for testing the characteristic value at an electrical voltage value generated by the emergency energy store, then the voltage can be determined with a voltage measuring device of a DC/DC converter. DC/DC converters usually have a voltage measuring device for adjusting the output voltage thereof. This voltage measuring device can therefore be used in a two-fold manner. Thus, no dedicated voltage measuring device needs to be supplied for testing the characteristic value of the emergency energy store.

According to another advantageous feature of the present invention, the characteristic value of the emergency energy store may also be tested during a shutdown of a rotor of the wind energy system, for example, in the absence of wind. According to this embodiment, during normal operation and during a shutdown of the rotor, the characteristic value may be tested by moving the pitch angle of a rotor blade within a pre-determined angular range. For this purpose, the actuating device again requires energy which may also be supplied exclusively from the emergency energy store.

According to another advantageous feature of the present invention, testing of the characteristic value may be automatically initiated by the pitch system. In other words, the testing may be carried out independently of the generator control system. In this way, the other components of the wind energy system, for example, the generator control system and other control systems may advantageously not require adaptation to the pitch system in order to enable testing of the characteristic value by the pitch system. A pitch system operated in this way can therefore easily be installed in a conventional wind energy system.

Advantageously, the emergency energy store may also be tested in cooperation with the generator control system. For this purpose, according to another advantageous feature of the present invention, testing of the emergency energy store may at least be initiated by a test signal from the generator control system. This results in the advantage that the testing of the characteristic value and control of the actuating device for setting the pitch angle can be coordinated with one another by the generator control system. The generator control system can thus always generate the test signal, for example, when a load profile favorable for testing the characteristic value is generated by the actuating device.

Since the generator control system typically has a relatively powerful processor, testing of the characteristic value may advantageously also be controlled by the generator control system and preferably for the operating variables of the wind energy system to also be able to be evaluated by the generator control system, in order to determine the aging state of the emergency energy store. In this development of the method, therefore, no specially configured processor needs to be provided in the pitch system.

Although the emergency energy store is at least partially discharged during testing, this does not necessarily prevent emergency maneuvers in the event that the external supply network fails during testing. If the wind energy system has a plurality of rotor blades and if the pitch angles of a plurality of rotor blades are set accordingly by actuating devices of the pitch system provided therefor, then according to one advantageous embodiment of the inventive method, in normal operation, only some of said actuating devices, preferably only one single actuating device, may be tested at one time. In other words, the actuating devices are never all simultaneously supplied with electrical energy exclusively from the emergency energy store thereof, in order to test the emergency energy store. If the supply network fails, at least some of the rotor blades can always be maneuvered into the safety position. This is usually sufficient to brake a rotor and to put the wind energy system into a safe state.

According to another advantageous feature of the present invention, the emergency energy store may be discharged only partially, so that an emergency maneuver is always possible. Then, the method can also be carried out for all the blades simultaneously.

A further aspect of the present invention relates to a pitch system for setting a pitch angle of at least one rotor blade of a wind energy system. The pitch system has at least one actuating device for setting a pitch angle of at least one rotor blade. The pitch system can receive electrical energy via a supply connection from an (external) electrical supply network. An emergency energy store of the pitch system is configured in order to operate at least one of the actuating devices in the event that the supply network fails. A control device of the pitch system is configured to operate the pitch system according to an embodiment of the inventive method. The pitch system according to the invention has the advantage that the emergency energy store for the actuating devices can also be tested in a normal operating mode of the wind energy system.

According to an advantageous embodiment of the pitch system according to the invention, at least one of the actuating devices together with an associated emergency energy supply may be connected to a DC link circuit of a frequency converter. The DC link circuit is coupled to the supply connection via a DC/DC converter. Testing of the emergency energy store can then simply be initiated by deactivating the DC/DC converter, which blocks current flow through the DC/DC converter. The deactivation can be carried out by switching, for example, power semiconductor switches of the DC/DC converter to a blocking state. Therefore, no additional electrical circuits need be provided for testing the emergency energy store.

The present invention also includes additional embodiments of the inventive pitch system similar to those described in conjunction with the inventive method. The additional embodiments of the inventive pitch system will therefore not be described again separately.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
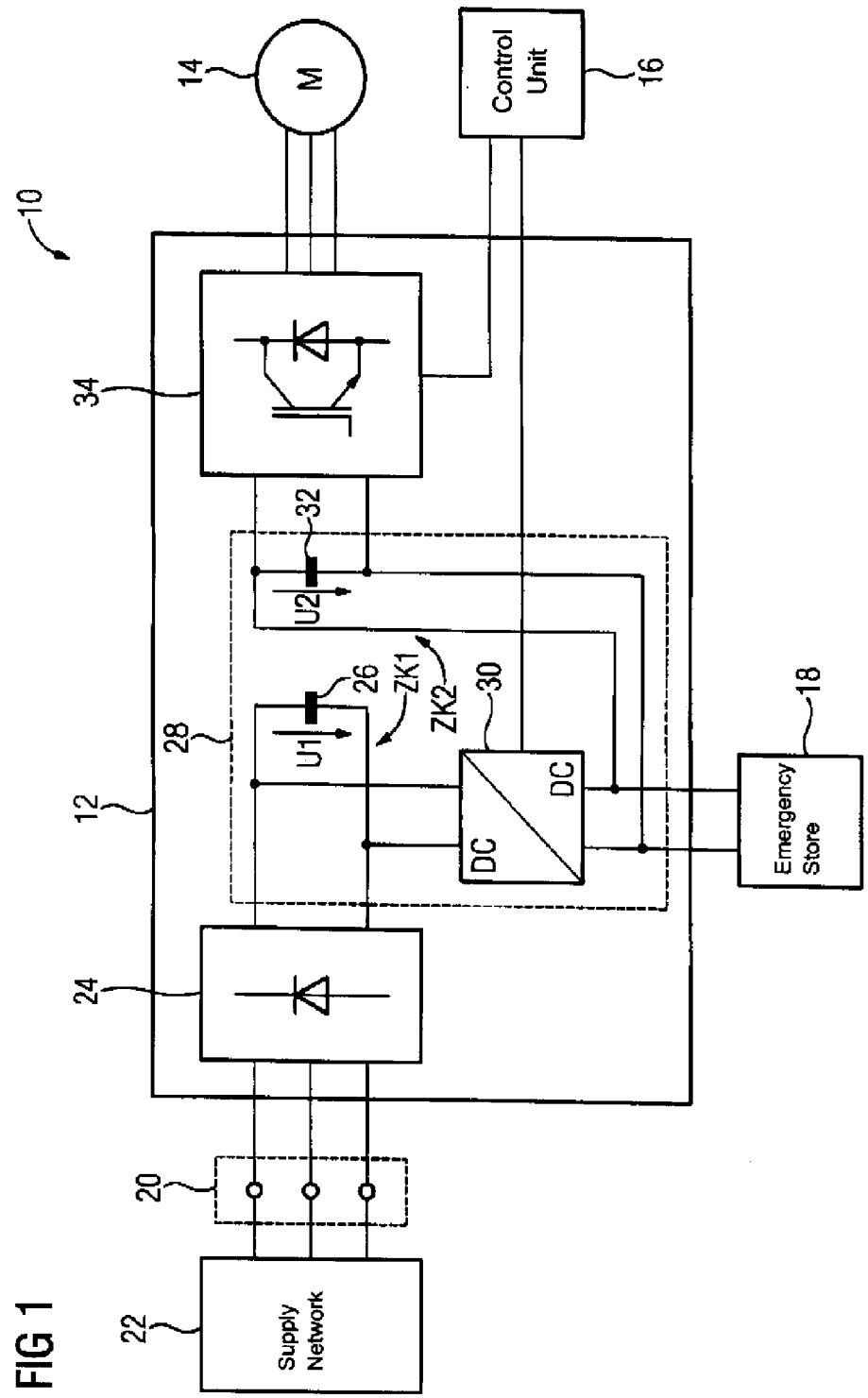
FIG. 1 shows a block circuit diagram of a blade adjustment system according to one embodiment of the pitch system according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a blade adjustment system or actuating system 10 which is installed in a wind energy system. By means of the actuating system 10, pitch angles of rotor blades (not shown) of a rotor of the wind energy system can be set. In FIG. 1 only components of the actuating system 10, by means of which just one of the rotor blades can be set with regard to the pitch angle thereof, are shown. The components are a frequency converter 12, an electric motor 14, a control unit 16 and an emergency energy store 18. By means of a supply connection 20 of the actuating system 10 the actuating system is electrically connected to a supply network 22, from which the frequency converter 12 receives electrical energy. The supply network 22 can be, for example, a three-phase alternating current network into which energy which is generated by a generator of the wind energy system is also fed by the wind energy system.

The electric motor 14 is mechanically coupled to the rotor blade via a gearbox (not shown). The rotor blade is rotated about the longitudinal axis thereof by operating the electric motor 14 and the pitch angle of the blade is thereby adjusted.

The energy for operation is received by the electric motor 14 from the frequency converter 12. For this purpose, the frequency converter 12 converts the alternating current received from the supply network 22 by means of a rectifier 24 into a rectified voltage U1, which is applied across a smoothing capacitor 26 of a supply-side portion ZK1 of a direct current link circuit 28 of the frequency converter 12.

The supply-side portion ZK1 of the link circuit 28 and a motor-side portion ZK2 of the link circuit 28 are connected to one another by means of a DC/DC converter 30. By means of the DC/DC converter 30 of the frequency converter 12, from the voltage U1, a rectified voltage U2 is generated which is applied across a further filter capacitor 32 of the link circuit 28. The rectified voltage U1 can have, for example, an effective value of 530 V here and the voltage U2 can have an effective value of between 300 V and 700 V. From the voltage U2, an actuator system or a controllable inverter 34 of the frequency converter 12 generates alternating voltages by means of which a torque-producing current is produced in the electric motor 14.

The emergency energy store 18 is connected to the motor-side portion ZK2 of the link circuit 28. The energy store is charged with electrical energy from the supply network 22 via the DC/DC converter 30 during operation of the frequency converter 12.

The DC/DC converter 30 and the inverter 34 are coupled to the control unit 16. The control unit 16 also receives a control signal from a generator control system (not shown) of the wind energy system. By means of the control signal, a target pitch angle for the rotor blade is pre-set. Depending on the control signal, the control unit 16 controls the actuator or the inverter 34, in order to adjust the pitch angle of the rotor blade to the target pitch angle by means of the electric motor 14. The control unit 16 can include, for example, a microcontroller or a signal processor, by means of which a control program is carried out.

During normal operation of the wind energy system, the emergency energy store 18 is discharged in a controlled manner at regular intervals, for example, weekly, to a pre-determined charge level and then charged again by the DC/DC converter 30. The discharging process is controlled by the DC/DC converter 30, which is connected upstream of the emergency energy store 18 and the inverter 34. For this purpose, the DC/DC converter 30 is switched off by the control unit 16 to initiate the discharging process. By this means, the supply-side portion ZK1 and the motor-side portion ZK2 of the link circuit 28 are electrically decoupled from one another, that is, the inverter 34 and the electric motor 14 are supplied with electrical energy only from the emergency energy store 18.

Testing the state of the emergency energy store 18 during the discharging and re-charging will now be described in greater detail making reference to FIG. 2. For this purpose, in FIG. 2, a possible circuit variant is shown by means of which the actuating system 10 of FIG. 1, for example, can be realized. In the variant shown in FIG. 2, the rectifier 24 is realized by a phase-commutated rectifier having three half-bridges consisting of diodes. In the link circuit 28, the DC/DC converter 30 is made from a unidirectional DC/DC converter consisting of two semiconductor power switches T1, T2, diodes and an inductor L. In this case, the inverter 34 includes three half-bridges, each having two semiconductor power switches and freewheeling diodes connected antiparallel thereto. The semiconductor power switches of the DC/DC converter 30 and of the inverter 34 may be, for example, IGBTs (insulated-gate bipolar transistors).

Figure 2:
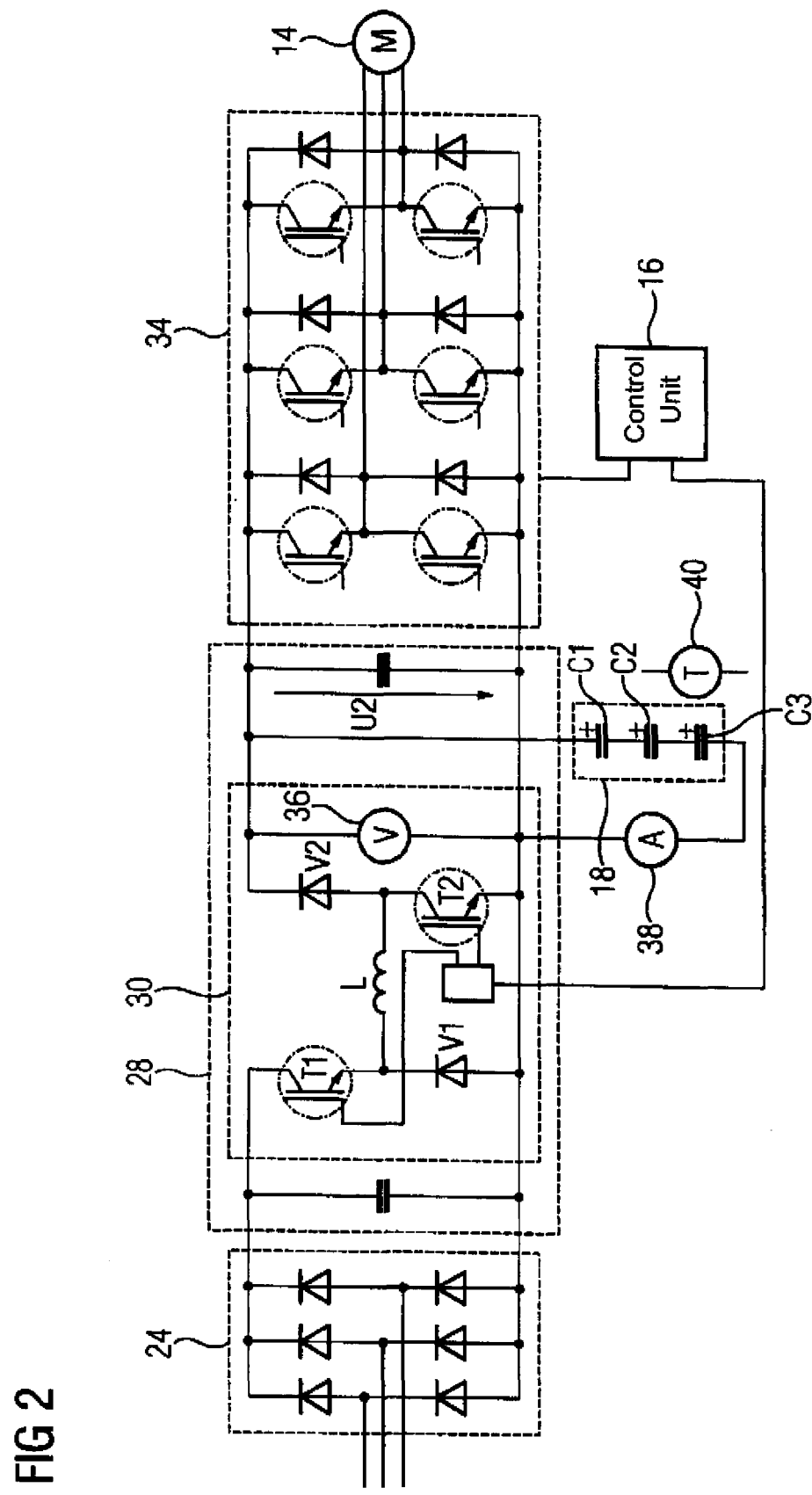
FIG. 2 shows a circuit diagram of a variant of the blade adjustment system of FIG. 1.

In this case, the emergency energy store 18 includes a series connection of double-layer capacitors C1 to C3, the double-layer capacitors C1 to C3 shown in FIG. 2 being merely representative for a larger number of double-layer capacitors. The emergency energy store can also be extended with parallel connection of further energy stores.

The control unit 16 monitors the voltage U2 which corresponds to the voltage generated by the emergency energy store 18, by means of a voltage measuring device 36 integrated into the DC/DC converter 30. The emergency energy store 18 is coupled via a current converter 38 to the motor-side portion. ZK2 of the link circuit 28. A signal from the current converter 38 is also received and evaluated by the control unit 16. An ambient temperature of the double-layer capacitors C1 to C3 is recorded via a temperature measuring circuit 40. The temperature measuring circuit 40 can, for example, include temperature sensors that are fastened to a circuit board which also electrically connects the capacitors C1 to C3 to the link circuit 28.

Thus the discharging process and also the subsequent charging process, as well as the ambient temperature, are observed overall and evaluated by the control unit 16 by measuring the voltage U2, the discharging current and the charging current of the emergency energy store 18. From these data, the capacity of the emergency energy store 18 is determined. In order to generate the charging current, the DC/DC converter 30 is reactivated by the control unit 16 and thus the energy feed from the supply network 22 to the emergency energy store 18 is made possible. The DC/DC converter 30 is activated by the control unit 16 when the voltage U2 undershoots a pre-determined store voltage threshold value. This value is freely adjustable by the control unit 16.

The store test can be carried out periodically. The pitch system can carry out the test autonomously, that is, all the control commands for the DC/DC converter 30 and the evaluation of the measurement values are issued by the control unit 16. Testing of the store can therefore be controlled in both an automated and a flexible manner. It is, in particular, also possible in this regard for safety aspects to be taken into account during testing. It is, for example, ensured that the testing of the emergency energy store 18 is not carried out at any time point for two or three emergency energy stores of the actuating system 10 simultaneously. Energy store testing can also be controlled and monitored by the generator control system to which the actuating system 10 is subordinated.

In the event that testing of the emergency energy store 18 is to be carried out according to a time stipulation and, in this time period, the wind energy system is static because, for example, there is no wind, the electric motor 14 can be moved within a limited range, so that thereby, discharging of the emergency energy store 18 is made possible.

In place of the phase-commutated rectifier 24 shown in FIG. 2, a controllable rectifier, for example, a step-up converter can also be provided. It is then possible to block the energy supply from the supply network 22 by means of this rectifier. It is then no longer necessary to deactivate a DC/DC converter in the link circuit in order to decouple the emergency energy store from the supply network. In place of the rectifier and the unidirectional DC/DC converter, a power-recovering inverter bridge with a bidirectional DC/DC converter can also be used.

The emergency energy store 18 can be, as in the example above, a circuit consisting of double-layer capacitors. Alternatively, the emergency energy store 18 can also include lithium battery cells or a combination of the two store types as a "hybrid" store.

The examples show how, during normal operation of the wind energy system, a process of discharging the emergency energy store is made possible in that a DC/DC converter, which also serves as a charging device, does not feed any energy into the emergency energy store or into the inverter. As a result, no separation of the emergency energy store and the charging device is required for testing, i.e. the switching effort involved is very small. The testing procedure is also greatly simplified in comparison with known methods in that no defined or reproducible load has to be set and measuring devices of the DC/DC converter which are already in use, in this case the voltage measuring device 36, can be used.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for operating a pitch system of a wind energy system, comprising the steps of:
   in a normal operating mode of the wind energy system, setting with an actuating device of the pitch system a pitch angle of a rotor blade of the wind energy system in response to a control signal from a generator control system of the wind energy system, wherein the actuating device is at least temporarily supplied with electrical energy from an external electrical supply network via at least one DC/DC converter,
   in an emergency operating mode, moving the rotor blade with the actuating device into a safety position, wherein the actuating device is supplied with electrical energy from an emergency energy store of the pitch system, wherein the emergency energy store is supplied with electrical energy from the supply network via the at least one DC/DC converter, and
   testing a characteristic value of the emergency energy store by deactivating the at least one DC/DC converter and temporarily supplying the actuating device in the normal operating mode with electrical energy exclusively from the emergency energy store.

2. The method of claim 1, wherein the characteristic value is tested by measuring with a voltage measuring device of a DC/DC converter a value of an electrical voltage generated by the emergency energy store.

3. The method of claim 1, wherein the characteristic value is tested during normal operation and during a shutdown of a rotor of the wind energy system by moving the pitch angle within a pre-determined angular range.

4. The method of claim 1, wherein testing of the characteristic value is automatically initiated by the pitch system.

5. The method of claim 1, wherein testing of the characteristic value is at least initiated by a test signal received from the generator control system.

6. The method of claim 1, wherein testing of the characteristic value is controlled by a test signal received from the generator control system.

7. The method of claim 1, wherein the characteristic value is tested by checking at least one of a capacitance of a capacitor of the emergency energy store and an internal resistance of a capacitor of the emergency energy store.

8. The method of claim 7, wherein a capacitance value of the capacitance is measured.

9. The method of claim 7, wherein the capacitor of the emergency energy store comprises a double-layer capacitor.

10. The method of claim 1, wherein the characteristic value is tested by measuring at least one operating variable selected from an electrical voltage present at the emergency energy store, an electric current flowing into or out of the emergency energy store, an ambient temperature of the emergency energy store, an internal temperature of the emergency energy store, a duration of a pre-determined discharging process, and a duration of a pre-determined charging process.

11. The method of claim 10, wherein the at least one operating variable is evaluated by the generator control system.

12. The method of claim 1, further comprising the steps of:
setting pitch angles of a plurality of rotor blades with corresponding actuating devices of the pitch system, with each of the actuating devices associated with a particular rotor blade and coupled to a dedicated emergency energy store, and
in normal operation, supplying only some of the actuating devices simultaneously with electrical energy exclusively from their dedicated emergency energy store in order to test the characteristic value of the respective dedicated emergency energy store.

13. The method of claim 12, wherein only a single actuating device is supplied exclusively with electrical energy from its dedicated emergency energy store in normal operation.

14. A pitch system for setting a pitch angle of at least one rotor blade of a wind energy system, comprising:
at least one actuating device for setting a pitch angle of at least one rotor blade,
a supply connection for receiving electrical energy from an electrical supply network,
an emergency energy store for operating the at least one actuating device when the supply network fails, and
a control device, which is configured to control the at least one actuating device responsive to a control signal from a generator control system by:
in a normal operating mode of the wind energy system, at least temporarily supplying the actuating device with electrical energy from the electrical supply network via at least one DC/DC converter,
when the supply network fails, moving the rotor blade with the actuating device into a safety position, wherein the actuating device is supplied with electrical energy from the emergency energy store, wherein the emergency energy store is supplied with electrical energy from the supply network via the at least one DC/DC converter, and
testing a characteristic value of the emergency energy store by deactivating the at least one DC/DC converter and temporarily supplying the actuating device in the normal operating mode with electrical energy exclusively from the emergency energy store.

15. The pitch system of claim 14, wherein the at least one actuating device together with the emergency energy store associated with the at least one actuating device is connected to a DC link circuit of a frequency converter and the DC link circuit is coupled to the supply connection via a DC/DC converter.

* * * * *